(12) United States Patent
Hwangbo et al.

(10) Patent No.: US 11,148,630 B2
(45) Date of Patent: Oct. 19, 2021

(54) AIRBAG DEVICE FOR PREVENTING COLLISION BETWEEN PASSENGERS

(71) Applicant: HYUNDAI MOBIS CO., LTD., Seoul (KR)

(72) Inventors: Sang Won Hwangbo, Yongin-si (KR); Hae Kwon Park, Yongin-si (KR); Seok Hoon Ko, Yongin-si (KR); Seok Min Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 47 days.

(21) Appl. No.: 16/741,518

(22) Filed: Jan. 13, 2020

(65) Prior Publication Data

US 2020/0254954 A1 Aug. 13, 2020

(30) Foreign Application Priority Data

Feb. 7, 2019 (KR) .................... 10-2019-0014430

(51) Int. Cl.
| | |
|---|---|
| *B60R 21/231* | (2011.01) |
| *B60R 21/207* | (2006.01) |
| *B60R 21/015* | (2006.01) |
| *B60R 21/215* | (2011.01) |
| *B60R 21/013* | (2006.01) |

(52) U.S. Cl.
CPC .......... *B60R 21/231* (2013.01); *B60R 21/013* (2013.01); *B60R 21/01512* (2014.10); *B60R 21/207* (2013.01); *B60R 21/215* (2013.01)

(58) Field of Classification Search
CPC ................. B60R 21/23138; B60R 21/233
See application file for complete search history.

(56) References Cited

U.S. PATENT DOCUMENTS

| | | | | |
|---|---|---|---|---|
| 4,076,277 | A * | 2/1978 | Kuwakado | B60R 21/231 280/738 |
| 9,744,932 | B1 * | 8/2017 | Faruque | B60R 21/16 |
| 9,789,840 | B2 * | 10/2017 | Farooq | B60R 21/214 |
| 9,902,362 | B2 * | 2/2018 | Farooq | B60N 2/14 |
| 10,065,592 | B2 * | 9/2018 | Jaradi | B60N 2/14 |
| 10,099,645 | B2 * | 10/2018 | Song | B60R 21/207 |
| 10,336,280 | B2 * | 7/2019 | Faruque | B60R 21/2338 |
| 10,343,642 | B2 * | 7/2019 | Faruque | B60R 21/23184 |
| 10,703,320 | B2 * | 7/2020 | Farooq | B60R 21/214 |
| 10,703,324 | B2 * | 7/2020 | Hill | B60R 21/231 |
| 10,807,556 | B2 * | 10/2020 | Hill | B60R 21/232 |
| 10,836,339 | B2 * | 11/2020 | Kadam | B60R 21/231 |
| 10,875,486 | B2 * | 12/2020 | Kim | B60R 21/207 |
| 10,981,531 | B2 * | 4/2021 | Jaradi | B60R 21/2338 |
| 2017/0259772 | A1 * | 9/2017 | Farooq | B60R 21/0136 |

FOREIGN PATENT DOCUMENTS

| | | | |
|---|---|---|---|
| JP | 2012012015 | A * | 1/2012 |
| JP | 4882459 | B2 * | 2/2012 |

* cited by examiner

*Primary Examiner* — Nicole T Verley
(74) *Attorney, Agent, or Firm* — DLA Piper LLP (US)

(57) ABSTRACT

An airbag device for preventing a collision between passengers may include: a base mounted in a vehicle; a cushion mounted on the base, and deployed between passengers when a vehicle collision occurs; and a cover mounted on the base, configured to cover the cushion, and broken when the cushion is deployed.

11 Claims, 6 Drawing Sheets

AIRBAG DEVICE FOR PREVENTING COLLISION BETWEEN PASSENGERS

CROSS-REFERENCE TO RELATED APPLICATION

The present application claims priority under 35 U.S.C. § 119(a) to Korean Patent Application No. 10-2019-0014430 filed on Feb. 7, 2019 in the Korean Intellectual Property Office, which is incorporated herein by reference in its entirety.

BACKGROUND

1. Technical Field

Embodiments of the present disclosure relate to an airbag device for preventing a collision between passengers, and more particularly, to an airbag device for preventing a collision between passengers, which can reduce an injury caused by a collision between passengers who are allowed to sit in any seat in an autonomous vehicle.

2. Related Art

In general, an airbag device refers to a device that ignites an inflator in case of a vehicle collision, and deploys a cushion using gas injected into the cushion, in order to protect a passenger.

Such an airbag device may include various types of airbag devices depending on the installation positions and functions thereof. For example, a driver airbag is mounted in a steering device to protect a driver. A passenger airbag is mounted in an instrument panel to protect a passenger seated on a passenger seat. A side airbag is disposed between a passenger and a door in case of a side collision of the vehicle. A roof airbag is deployed between a panorama sunroof and a passenger to protect the passenger.

Recently, research is actively conducted on an autonomous vehicle. Since the autonomous vehicle does not need to be driven by a driver in person, the positions where passengers are seated in the vehicle may be changed in various manners.

However, when a collision accident of the autonomous vehicle occurs, a collision between the passengers may cause a secondary injury. Therefore, there is a need for a device capable of solving the problem.

SUMMARY

Various embodiments are directed to an airbag device for preventing a collision between passengers, which can reduce an injury caused by a collision between passengers who are allowed to sit in any seat in an autonomous vehicle.

In an embodiment, an airbag device for preventing a collision between passengers may include: a base mounted in a vehicle; a cushion mounted on the base, and deployed between passengers when a vehicle collision occurs; and a cover mounted on the base, configured to cover the cushion, and broken when the cushion is deployed.

The base may include: a base shaft; and a plurality of base plates disposed along the circumference of the base shaft.

The plurality of base plates may be radially disposed along the circumference of the base shaft.

The base may further include a base head formed at the top of the base shaft and configured to protect the base plates.

The base may further include a base rotating part which is mounted on the base shaft and to which the base plate is rotatably coupled.

The base may further include: a base sensor configured to sense the position of a passenger; a base controller configured to receive a sensing signal of the base sensor; and a base driver configured to rotate the base plate according to a control signal of the base controller.

The cushion may include: a cushion coupling part coupled to the base plate; a cushion deployment part connected to the cushion coupling part so as to be deployed; and a cushion supply part configured to supply fluid to the cushion deployment part.

The cushion deployment part may include: a deployment lower part connected to the cushion coupling part and deployed in a lateral direction of the base shaft; and a deployment upper part deployed upward from the deployment lower part.

The cushion may further include: a cushion sensor configured to sense whether a vehicle collision occurs; and a cushion controller configured to receive a sensing signal of the cushion sensor and control the cushion supply part.

The cover may include: a cover inner skin having one end rotatably mounted on any one of the base plates, and the other end coupled to another one of the base plates so as to be breakable by outer pressure; and a cover outer skin configured to cover the cover inner skin.

The cover may further include a cover fixing part configured to restrict rotation of the cover inner skin.

In the airbag device for preventing a collision between passengers in accordance with the embodiment of the present disclosure, the cushion mounted on the base may be deployed between passengers so as to prevent a collision between the passengers.

In the airbag device for preventing a collision between passengers in accordance with the embodiment of the present disclosure, the base head may be formed at the top of the base shaft to protect the base plate, and used as a table.

In the airbag device for preventing a collision between passengers in accordance with the embodiment of the present disclosure, the base plate may be rotatably mounted on the base rotating part mounted on the base shaft, and change the deployment direction of the cushion mounted on the base plate.

In the airbag device for preventing a collision between passengers in accordance with the embodiment of the present disclosure, the base sensor senses the positions of the passengers in real time. Under control of the base controller, the base driver may be operated to rotate the base plate. Thus, the cushion may be deployed between the passengers.

In the airbag device for preventing a collision between passengers in accordance with the embodiment of the present disclosure, when the cushion is deployed, one end of the cover inner skin may be mounted on the base plate and rotated to induce the deployment of the cushion. The cover fixing part may restrict the rotation of the cover inner skin, thereby maintaining the function of the cover inner skin.

DETAILED DESCRIPTION

Hereinafter, an airbag device for preventing a collision between passengers will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
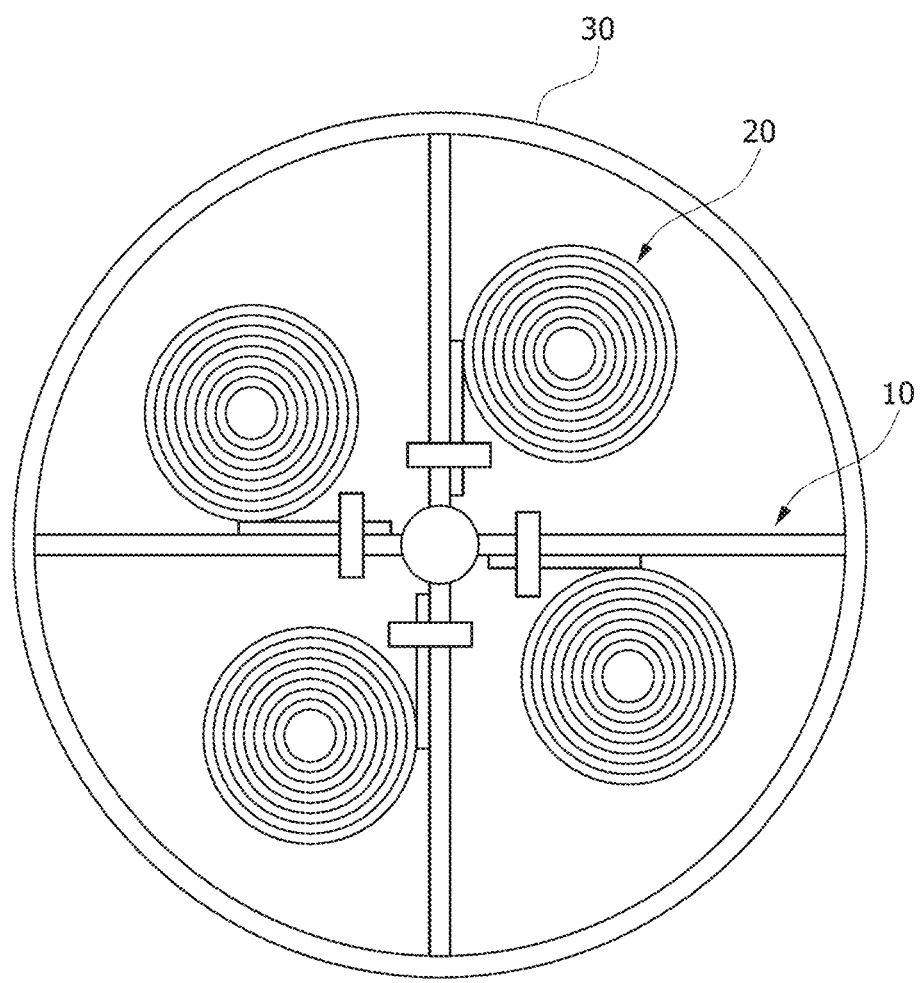
FIG. 1 is a diagram schematically illustrating a state before an airbag device for preventing a collision between passengers in accordance with an embodiment of the present disclosure is deployed.
Figure 2:
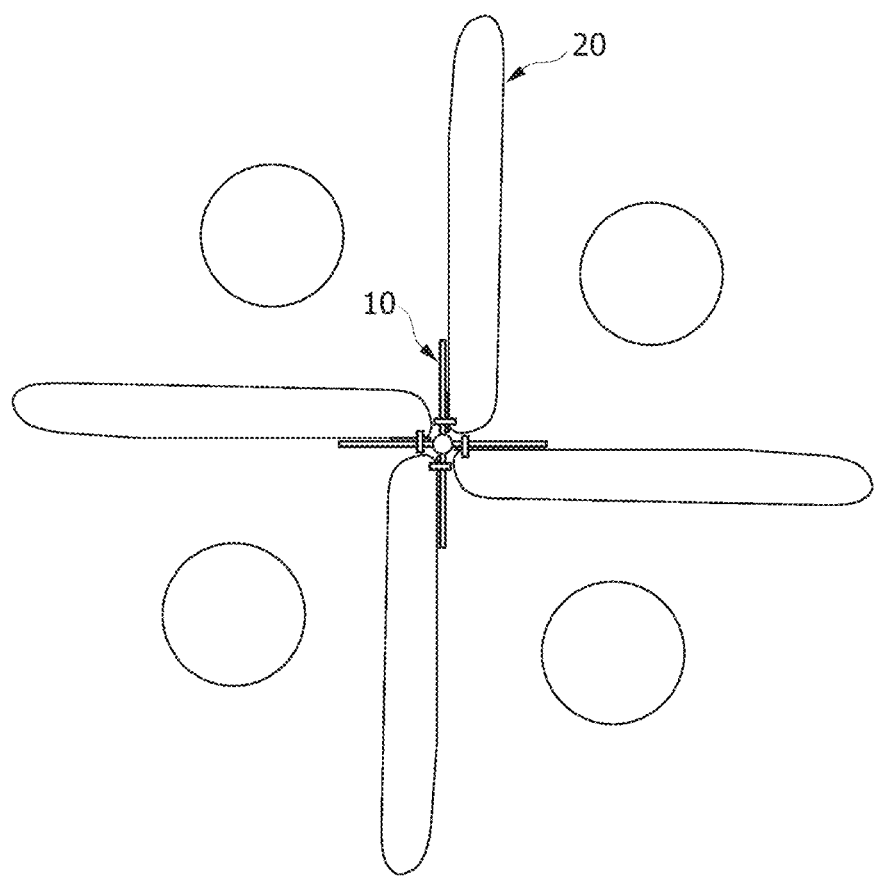
FIG. 2 is a diagram schematically illustrating a state after the airbag device for preventing a collision between passengers in accordance with the embodiment of the present disclosure is deployed.

FIG. 1 is a diagram schematically illustrating a state before an airbag device for preventing a collision between passengers in accordance with an embodiment of the present disclosure is deployed, and FIG. 2 is a diagram schematically illustrating a state after the airbag device for preventing a collision between passengers in accordance with the embodiment of the present disclosure is deployed. Referring to FIGS. 1 and 2, the airbag device 1 for preventing a collision between passengers in accordance with the embodiment of the present disclosure includes a base 10, a cushion 20 and a cover 30.

The base 10 is mounted in a vehicle. For example, the positions and shapes of seats in an autonomous vehicle can be changed so that passengers can be seated at various postures and positions. The base 10 may be fixedly installed in the center of the vehicle.

The cushion 20 is mounted in the base 10, and deployed between passengers when a vehicle collision occurs. For example, the cushion 20 may be folded and stored at the initial stage, and unfolded and disposed between the passengers when a vehicle collision occurs.

The cover 30 is mounted on the base 10 so as to cover cushion 20. The cover 30 may cover the cushion 20 which is folded before deployment, and be broken by pressurization of the deployed cushion 20.

Figure 3:
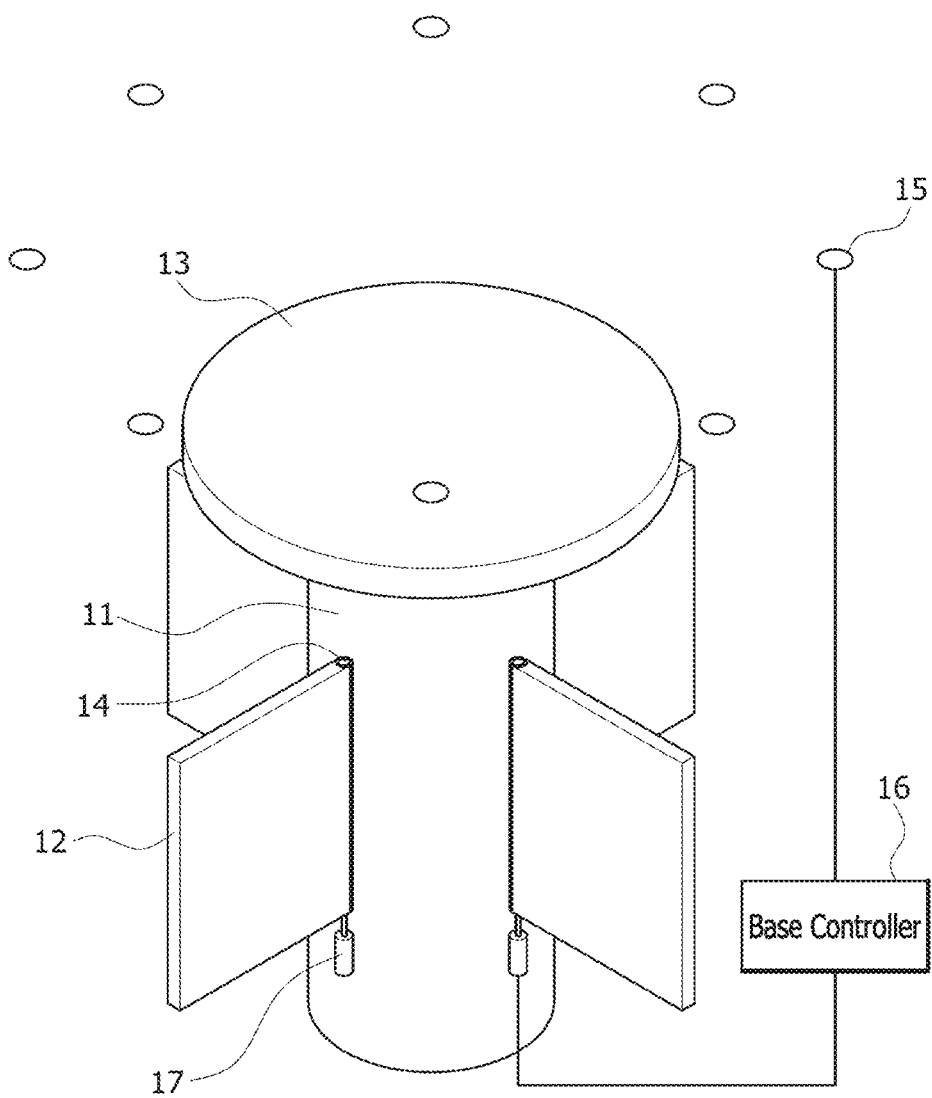
FIG. 3 is a diagram schematically illustrating a base in accordance with the embodiment of the present disclosure.

FIG. 3 is a diagram schematically illustrating the base in accordance with the embodiment of the present disclosure. Referring to FIG. 3, the base 10 in accordance with the embodiment of the present disclosure includes a base shaft 11 and a plurality of base plates 12.

The base shaft 11 is fixedly installed in the center of the vehicle. For example, the base shaft 11 may have a lower end coupled to the bottom surface of a vehicle body, and have a height corresponding to a seat.

The plurality of base plates 12 are disposed along the circumference of the base shaft 11. The number of the base plates 12 may correspond to the maximum number of passengers in the vehicle. For example, when the maximum number of passengers in the vehicle is four, four base plates 12 are radially disposed along the circumference of the base shaft 11.

The base 10 in accordance with the embodiment of the present disclosure may further include a base head 13. The base head 13 is formed at the top of the base shaft 11, and protects the base plates 12. For example, a disk-shaped table having a radius corresponding to or larger than the length of the base plate 12 may be used as the base head 13. The base head 13 may be disposed over the base plates 12 to protect the base plates 12, and serve as a table such that a passenger can lean against the base head 13 or place an object on the base head 13. When the cover 30 is coupled to the base head 13, the cover 30 may cover the base plates 12.

The base 10 in accordance with the embodiment of the present disclosure may further include a base rotating part 14. The base rotating part 14 is mounted on the base shaft 11, and the base plate 12 is rotatably coupled to the base rotating part 14. For example, the base rotating part 14 may be mounted on the outer circumferential surface of the base plate 12, and the base plate 12 may be hinge-coupled to the base rotating part 14 and thus rotated.

The base 10 in accordance with the embodiment of the present disclosure may further include a base sensor 15, a base controller 16 and a base driver 17.

The base sensor 15 senses the position of a passenger. For example, the base sensor 15 may be mounted in a seat to sense the position of a passenger and whether the passenger is seated. In addition, the base sensor 15 may be disposed in the roof of the vehicle so as to be separated in a circumferential direction, and serve to sense the position of a passenger.

The base controller 16 receives a sensing signal of the base sensor 15, and the base driver 17 is driven to rotate the base plate 12 according to a control signal of the base controller 16. For example, the base driver 17 may be fixedly installed on the base shaft 11, and serve as a motor which can be driven to rotate the corresponding base plate 12 when power is applied with the base driver 17 connected to a rotating shaft of the base plate 12. The base controller 16 may receive the sensing signal of the base sensor 15, and control the base driver 17 to dispose the base plate 12 between passengers in real time.

Figure 4:
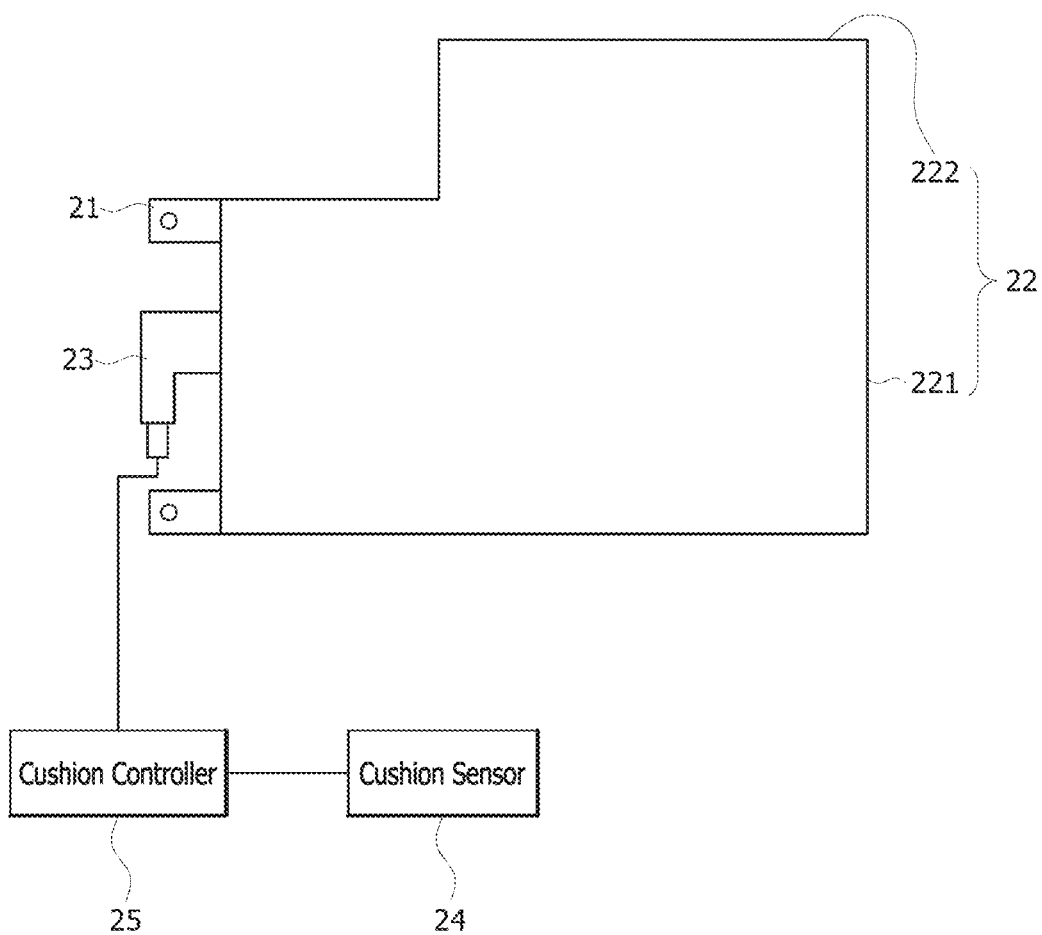
FIG. 4 is a diagram schematically illustrating a cushion in accordance with the embodiment of the present disclosure.

FIG. 4 is a diagram schematically illustrating the cushion in accordance with the embodiment of the present disclosure. Referring to FIG. 4, the cushion 20 in accordance with the embodiment of the present disclosure includes a cushion coupling part 21, a cushion deployment part 22 and a cushion supply part 23.

The cushion coupling part 21 is coupled to the base plate 12, and the cushion deployment part 22 is connected to the cushion coupling part 21. For example, a plurality of cushion coupling parts 21 may be disposed so as to be spaced apart from each other depending on the height of the base plate 12.

The cushion supply part 23 supplies fluid to the cushion deployment part 22. For example, the cushion supply part 23 may serve as an inflator which is exploded to supply gas for deployment, when power is applied.

The cushion deployment part 22 in accordance with the embodiment of the present disclosure includes a deployment lower part 221 and a deployment upper part 222.

The deployment lower part 221 is coupled to the cushion coupling part 21, and deployed in a lateral direction of the base shaft 11. For example, the deployment lower part 221 may be designed to have a top-to-bottom length corresponding to or smaller than the top-to-bottom length of the base shaft 11. The side-to-side length of the deployment lower part 221 may be designed in such a manner that the deployment lower part 221 can be disposed between passengers when completely deployed.

The deployment upper part 222 is deployed upward from the deployment lower part 221. For example, the deployment upper part 222 may be extended upward from an end of the deployment lower part 221 and thus prevent a collision between passengers. The deployment upper part 222 may be disposed so as not to interfere with the base head 13, and deployed to approach the inner ceiling of the vehicle.

The cushion 20 in accordance with the embodiment of the present disclosure may further include a cushion sensor 24 and a cushion controller 25.

The cushion sensor 24 senses whether a vehicle collision occurs. For example, the cushion sensor 24 may be mounted on the outside of the vehicle to sense whether a vehicle collision occurs, and transmit a sensing signal to the base controller 16.

The cushion controller 25 receives the sensing signal of the cushion sensor 24 and controls the cushion supply part 23. For example, when the cushion supply part 23 is driven under control of the cushion controller 25, the cushion deployment part 22 may be deployed by gas supplied to the cushion deployment part 22.

Figure 5:
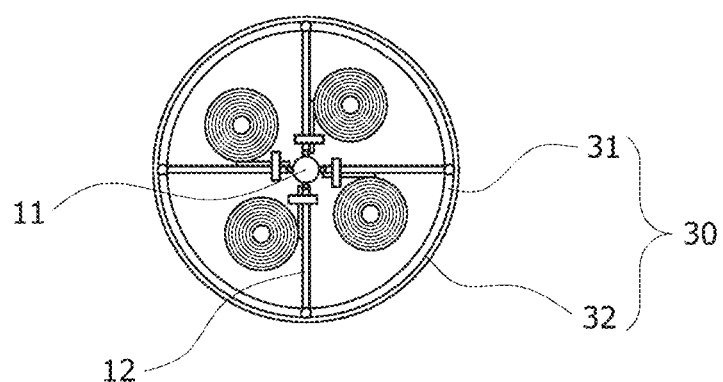
FIG. 5 is a diagram schematically illustrating a cover before the cushion in accordance with the embodiment of the present disclosure is deployed.
Figure 6:
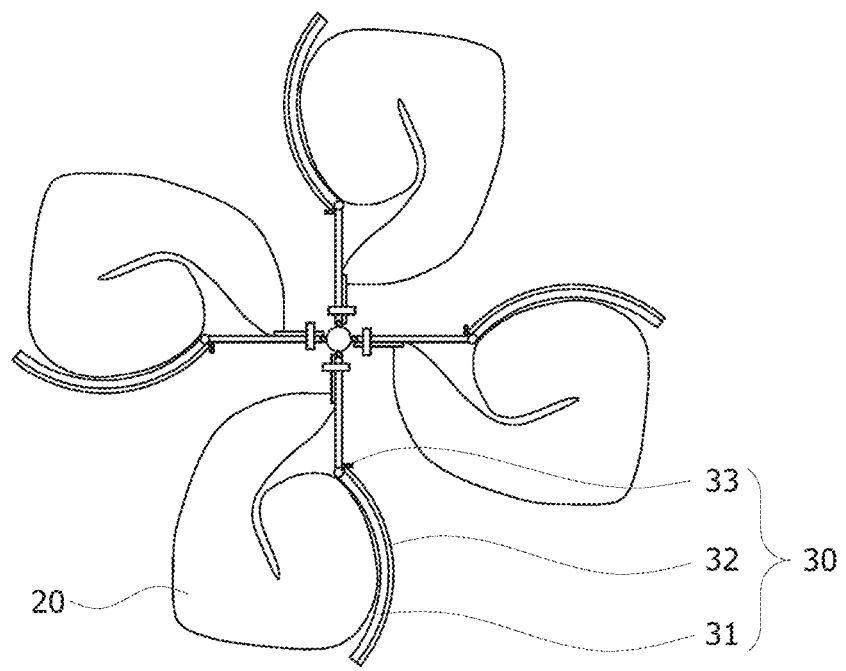
FIG. 6 is a diagram schematically illustrating the cover when the cushion in accordance with the embodiment of the present disclosure is deployed.
Figure 7:
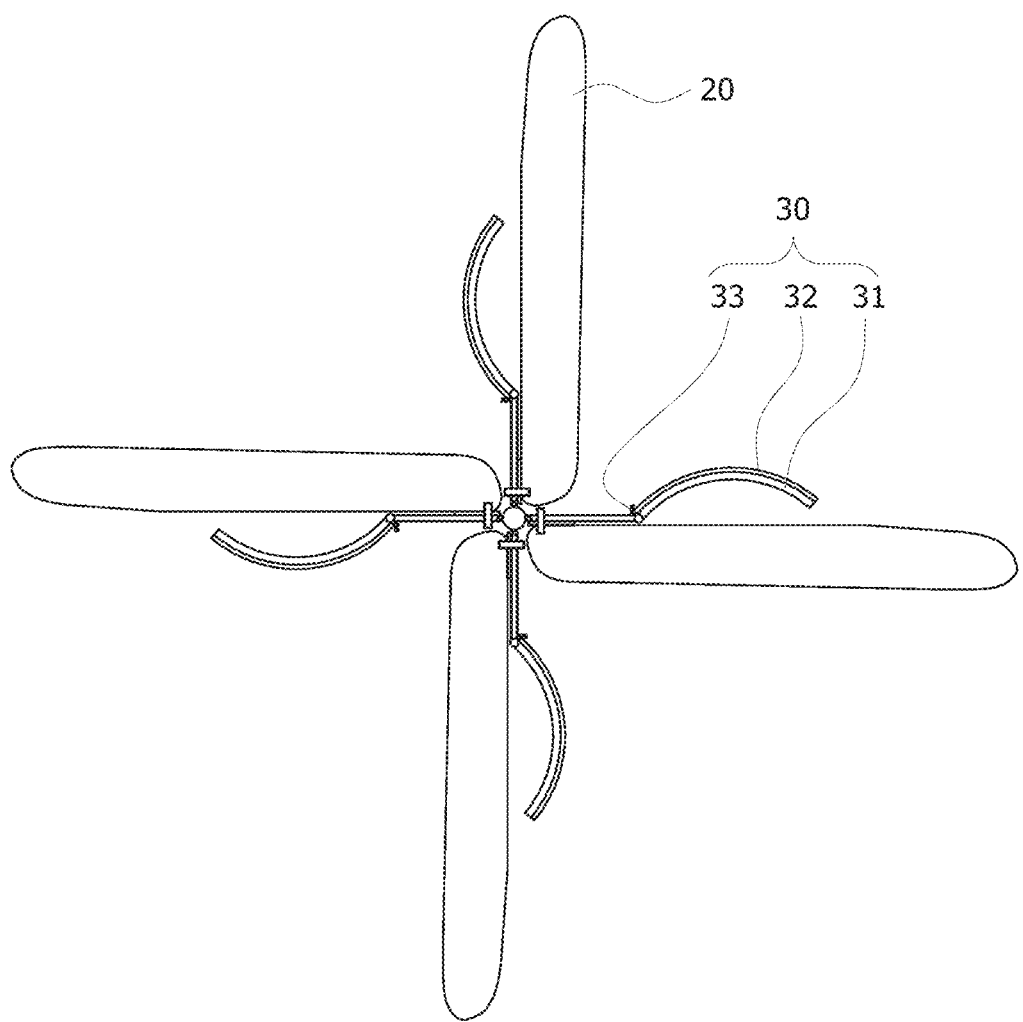
FIG. 7 is a diagram schematically illustrating the cover after the cushion in accordance with the embodiment of the present disclosure is deployed.

FIG. 5 is a diagram schematically illustrating the cover before the cushion in accordance with the embodiment of the present disclosure is deployed, FIG. 6 is a diagram schematically illustrating the cover when the cushion in accordance with the embodiment of the present disclosure is deployed, and FIG. 7 is a diagram schematically illustrating the cover after the cushion in accordance with the embodiment of the present disclosure is deployed. Referring to FIGS. 5 to 7, the cover 30 in accordance with the embodiment of the present disclosure includes a cover inner skin 31 and a cover outer skin 32.

The cover inner skin 31 has one end rotatably mounted on any one base plate 12 and the other end coupled to another base plate 12. The other end of the cover inner skin 31 is coupled to the base plate 12 so as to be breakable by outer pressure. For example, the cover inner skin 31 may have a curved or flat surface. The other end of the cover inner skin 31 may be separated from the base plate 12 by the deployment pressure of the deployed cushion 20. The plurality of cover inner skins 31 may be connected to form a closed section.

When the base plate 12 is not rotated by itself, the cover inner skin 31 may be partially made of a resin material which is restricted from being deformed by the deployed cushion 20.

When the base plate 12 can be rotated by the base rotating part 14, the cover inner skin 31 may be partially creased or partially made of an elastic material such that the base plate 12 is smoothly rotated.

The cover outer skin 32 covers the cover inner skin 31. For example, the cover outer skin 32 covers the cover inner skin 31, and includes a buffer material. The cover outer skin 32 may be cut when the cover inner skin 31 is rotated, thereby guaranteeing a smooth operation of the cover inner skin 31.

The cover 30 in accordance with the embodiment of the present disclosure may further include a cover fixing part 33. The cover fixing part 33 may restrict the rotation of the cover inner skin 31, and thus induce the deployment direction of the deployed cushion 20. For example, the cover inner skin 31 may be hinge-coupled to an end of the base plate 12, and the cover fixing part 33 may restrict the hinge-shaft rotation of the cover inner skin 31 when the cover inner skin 31 is rotated to be in alignment with the base plate 12. In addition, various types of parts may be employed as the cover fixing part 33, as long as they can be coupled to the base plate 12 and restrict the cover inner skin 31 from rotating by a preset angle or more.

The operation of the airbag device for preventing a collision between passengers in accordance with the embodiment of the present disclosure, which has the above-described structure, will be described as follows.

The base shaft 11 is fixedly installed in the vehicle, and the plurality of base plates 12 are disposed along the circumference of the base shaft 11. The base plates 12 are mounted on the base shaft 11 so as to be rotated by the base rotating part 14.

Each of the base plates 12 has the cushion 20 mounted thereon, and the cushion 20 is covered by the cover 30. The base head 13 may be formed at the top of the base shaft 11, and not only protect the base plate 12, but also be used as a table in the vehicle.

In the above-described state, when the cushion sensor 24 senses a vehicle collision through a sensor or camera, the cushion supply part 23 is operated to supply gas to the cushion deployment part 22 under control of the cushion controller 25. Therefore, the cushion deployment part 22 is deployed.

At this time, the cushion deployment part 22 includes the deployment lower part 221 which is deployed in a lateral direction of the base shaft 11 and the deployment upper part 222 which is deployed upward from the deployment lower part 221 and thus can prevent a collision between passengers.

The cushion sensor 24 transmits a collision sensing signal to the base controller 16, and the base controller 16 receives a sensing signal of the base sensor 15 and identifies the real-time positions of the passengers seated in the vehicle.

The base controller 16 receiving the sensing signal of the base sensor 15 controls the base driver 17 to rotate the base plate 12 such that the base plate 12 is disposed between the passengers. Thus, the cushion 20 mounted on the base plate 12 may be deployed between the passengers, and thus prevent a collision between the passengers.

In the airbag device 1 for preventing a collision between passengers in accordance with the embodiment of the present disclosure, the cushion 20 mounted on the base 10 may be deployed between the passengers so as to prevent a collision between the passengers.

In the airbag device 1 for preventing a collision between passengers in accordance with the embodiment of the present disclosure, the base head 13 may be formed at the top of the base shaft 11 to protect the base plate 12, and used as a table.

In the airbag device 1 for preventing a collision between passengers in accordance with the embodiment of the present disclosure, the base plate 12 may be rotatably mounted on the base rotating part 14 mounted on the base shaft 11, and change the deployment direction of the cushion 20 mounted on the base plate 12.

In the airbag device 1 for preventing a collision between passengers in accordance with the embodiment of the present disclosure, the base sensor 15 senses the positions of the passengers in real time. Under control of the base controller 16, the base driver 17 is operated to rotate the base plate 12. Thus, the cushion 20 may be deployed between the passengers. Therefore, although passengers are allowed to sit on any seats in an autonomous vehicle, the base sensor 15 may sense the positions of the passengers in real time and thus prevent a collision between the passengers.

In the airbag device 1 for preventing a collision between passengers in accordance with the embodiment of the present disclosure, when the cushion 20 is deployed, one end of the cover inner skin 31 may be mounted on the base plate 12 and rotated to induce the deployment of the cushion 20. The cover fixing part 33 may restrict the rotation of the cover inner skin 31, thereby maintaining the function of the cover inner skin 31.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag device for preventing a collision between passengers, comprising:
 a base mounted in a vehicle;
 a cushion mounted on the base, and deployed between passengers when a vehicle collision occurs;
 a cover mounted on the base, configured to cover the cushion, and broken when the cushion is deployed,
 wherein the base comprises:
 a base shaft, and
 a base rotating part mounted on the base shaft.

2. The airbag device for preventing a collision between passengers of claim 1, wherein the base further comprises:
 a plurality of base plates disposed along the circumference of the base shaft.

3. The airbag device for preventing a collision between passengers of claim 2, wherein the plurality of base plates are radially disposed along the circumference of the base shaft.

4. The airbag device for preventing a collision between passengers of claim 2, wherein the base further comprises a base head formed at the top of the base shaft and configured to protect the base plates.

5. The airbag device for preventing a collision between passengers of claim 2, wherein the base plate is rotatably coupled to the base rotating part.

6. The airbag device for preventing a collision between passengers of claim 5, wherein the base further comprises:
 a base sensor configured to sense the position of a passenger;
 a base controller configured to receive a sensing signal of the base sensor; and
 a base driver configured to rotate the base plate according to a control signal of the base controller.

7. The airbag device for preventing a collision between passengers of claim 2, wherein the cushion comprises:
 a cushion coupling part coupled to the base plate;
 a cushion deployment part connected to the cushion coupling part so as to be deployed; and
 a cushion supply part configured to supply fluid to the cushion deployment part.

8. The airbag device for preventing a collision between passengers of claim 7, wherein the cushion deployment part comprises:
 a deployment lower part connected to the cushion coupling part and deployed in a lateral direction of the base shaft; and
 a deployment upper part deployed upward from the deployment lower part.

9. The airbag device for preventing a collision between passengers of claim 7, wherein the cushion further comprises:
 a cushion sensor configured to sense whether a vehicle collision occurs; and
 a cushion controller configured to receive a sensing signal of the cushion sensor and control the cushion supply part.

10. The airbag device for preventing a collision between passengers of claim 2, wherein the cover comprises:
 a cover inner skin having one end rotatably mounted on any one of the base plates, and the other end coupled to another one of the base plates so as to be breakable by outer pressure; and
 a cover outer skin configured to cover the cover inner skin.

11. The airbag device for preventing a collision between passengers of claim 10, wherein the cover further comprises a cover fixing part configured to restrict rotation of the cover inner skin.

* * * * *